United States Patent [19]

Bellairs et al.

[11] Patent Number: 4,863,788
[45] Date of Patent: Sep. 5, 1989

[54] WATERPROOF BREATHABLE MICROPOROUS MEMBRANE WITH CELLULAR FOAM ADHESIVE

[75] Inventors: George L. Bellairs, Clarkston; Chris E. Nowak, Southfield; Mahner Parekh, Warren, all of Mich.

[73] Assignee: Micropore, Bloomfield Hills, Mich.

[21] Appl. No.: 156,298

[22] Filed: Feb. 16, 1988

[51] Int. Cl.⁴ .............................................. B32B 3/26
[52] U.S. Cl. ................... 428/246; 427/244; 427/245; 427/373; 427/407.1; 428/286; 428/315.9; 428/316.6; 428/317.5
[58] Field of Search .......... 427/244, 245, 373, 407.1; 428/246, 286, 315.5, 315.7, 315.9, 316.6, 317.1, 317.3, 317.5, 317.7

[56] References Cited

U.S. PATENT DOCUMENTS

| | | | |
|---|---|---|---|
| 3,748,217 | 7/1973 | May et al. | 156/78 |
| 3,953,566 | 4/1976 | Gore | 264/288 |
| 4,194,041 | 3/1980 | Gore et al. | 428/422 |
| 4,203,848 | 5/1980 | Grandine, II | 210/490 |
| 4,265,962 | 5/1981 | May | 428/287 |
| 4,316,772 | 2/1982 | Cheng et al. | 210/500.2 |
| 4,333,786 | 6/1982 | Cioardi et al. | 428/317.5 |
| 4,344,999 | 8/1982 | Gohlke | 428/212 |
| 4,384,047 | 5/1983 | Berzinger et al. | 521/64 |
| 4,385,093 | 5/1983 | Hubis | 428/316.6 |
| 4,409,275 | 10/1983 | Samowich | 428/317.5 |
| 4,443,511 | 4/1984 | Worden et al. | 428/198 |
| 4,473,473 | 9/1974 | Cheng | 210/490 |
| 4,478,665 | 10/1984 | Hubis | 156/229 |
| 4,482,516 | 11/1984 | Bowman et al. | 264/127 |
| 4,537,817 | 8/1985 | Guillaume | 428/260 |
| 4,554,198 | 11/1985 | Blücher et al. | 428/143 |
| 4,619,854 | 10/1986 | Penttimen et al. | 428/99 |

FOREIGN PATENT DOCUMENTS 7209319 1/1973 Netherlands ................... 428/315.5

Primary Examiner—William J. Van Balen
Attorney, Agent, or Firm—Limbach, Limbach & Sutton

[57] ABSTRACT

A multilayered, breathable, waterproof fabric and a process for manufacturing this fabric have been disclosed. The invention consists of a fabric substrate first coated with an adhesive foam formed from a fully reacted polymer such as polyvinyl chloride, polyurethane, acrylic, polystyrene or mixtures thereof. A microporous membrane structure is formed upon the adhesive foam from thermoplastic polymers. The microporous membrane provides the coated fabric with the properties of waterproofness and breathability. A continuous film formed from acrylic, polyvinyl chloride or polyurethane latexes, is coated on the surface of the microporous layer. The function of this continuous film is to protect the delicate microporous membrane. The process of manufacturing the waterproof and breathable fabric utilizes economical coating technology rather than costly laminating techniques used in the prior art of manufacture of breathable fabrics.

7 Claims, 5 Drawing Sheets

WATERPROOF BREATHABLE MICROPOROUS MEMBRANE WITH CELLULAR FOAM ADHESIVE

TECHNICAL FIELD

This invention relates to a breathable waterproof fabric. More specifically, this fabric comprises a microporous membrane layer sandwiched between a cellular foam adhesive layer and a continuous film protective layer.

BACKGROUND OF THE INVENTION

The garment industry has experienced rapid technological expansion due to scientific developments in laminating and coating techniques. Originally, polymers such as thermoset and thermoplastic polyurethane, silicon rubber, polyvinylchloride, and the like were used to coat and produce waterproof fabrics used in the manufacture of rainwear. Unfortunately, these garments suffered from several drawbacks, and consumers found the garments uncomfortable. Although polymer coatings did not let liquid water in, the coated fabrics did not permit satisfactory evaporation of the users' perspiration, thus causing discomfort and chilling.

It is now known that a waterproof garment can be rendered breathable by providing the fabric with a microporous layer. This layer allows for passage of water vapor by diffusion from inside the garment, through the microporous structure, to the outside due to the vapor pressure gradient across the microporous layer. The small size of the surface micropores, on the order of 1.0 micron, and the high surface tension of liquid water, combine to prohibit the passage of liquid water through the membrane. A number of products for use in sports, outerwear and camping have been manufactured by laminating membranes with these properties to shell fabrics. One such garment is described in U.S. Pat. No. 4,194,041 to Gore et al.

Several drawbacks exist in the practice of the above disclosed invention. The microporous layer is composed of polytetrafluoroethylene (PTFE) which has no known practical solvent. The manufacturing technique used to produce the membrane is therefore rigid and costly. To be rendered useful, an extruded film of the PTFE must be heated to its crystalline melt point under controlled tension, thus producing a microporous PTFE membrane. An additional lamination step for adhesion of the PTFE membrane to the garment fabric is also required.

Microporous membranes have also been used for microfiltration and reverse osmosis. These microporous membranes are normally prepared by treating a solvent solution of a suitable polymer with a liquid that is miscible with the solvent and acts as a non-solvent for the polymer. The process is commonly referred to as the solvent/non-solvent method. Variations of this method are described in U.S. Pat. Nos. 4,203,848, 4,316,722 and 4,384,047. In the above applications the objective is to prepare a microporous membrane of a specific pore size and very small pore size distribution.

However, a number of problems must be overcome in order to use this technique on textile substrates. Filtration membranes produced using the solvent/non-solvent process usually possess a high flexural modulus. Filtration membranes manufactured from thermoplastic polyvinylidene fluoride (PVDF) for example, exhibit a bending radius well above 3.0 centimeters when subjected to stiffness testing as provided in ASTM D1388-64. A fabric attached to the above filtration membranes would possess undesirable stiffness due to the high membrane bending radius.

Further, the microporous membranes used in filtration technology are prepared from fully reacted polymers and do not possess adhesion properties. Additionally, application of the liquid polymer solutions used to produce filtration membranes to the surface of the textile fabrics results in polymer solution striking through the fabric. The polymer fills the space between the normally freely moving fibers. This adversely affects the breathability and hand, or feel, of the fabric, making it overly stiff.

U.S. Pat. No. 3,748,217 describes the use of foamed polymeric materials in the manufacture of draperies. The foamed materials are used as backing material, and in conjunction with bonded non-woven materials to modify the appearance and drape of the textile fabrics, and to increase opacity of the product.

Two basic techniques are used for the production of foamed materials. One involves the reaction of prepolymers with the production of a gas as a side product. The produced gas acts as a blowing agent for the reacting polymer, producing the foam structure. This technique involves the use of toxic and difficult to handle materials such as isocyanates. The second technique involves the addition of precisely metered amounts of an inert gas into a water or solvent-based solution of a fully reacted polymer. These mechanically produced foams have also been used for bonding paper and non-woven fabrics. In the above applications, the problems of substrate breathability, adhesive strike-through and stiffness of feel are not addressed.

A fabric coated with a suitable microporous membrane may have acceptable breathability and waterproofness. However no garment could be made from this coated fabric since the microporous membrane is very delicate and susceptible to damage during manufacture and use of the garment. It is very difficult to attach a protective layer to a fully reacted, highly cross-linked polymer such as PTFE or PVDF from which a microporous membrane has been prepared. To overcome this problem, U.S. Pat. No. 4,194,041 uses costly laminating techniques and reactive, toxic and difficult to handle pre-polymers.

SUMMARY OF THE INVENTION

Accordingly, it is an object of the present invention to prepare a breathable and waterproof fabric comprised of fully reacted, non-toxic polymers, employing energy efficient coating methods.

It is another object of the instant invention to prepare a breathable, waterproof microporous membrane that is attached to the fabric by means of a cellular foam adhesive.

It is a further object of the subject invention to prepare, using mechanical foaming techniques, a suitable cellular foam adhesive from fully reacted and water based polymers.

It is another object of the present invention to prepare a microporous membrane from a suitable polymer, using the solvent/non-solvent method.

It is still a further object of the present invention to prepare a microporous membrane from materials with low flexural modulus, such that the resulting microporous membrane exhibits acceptable softness for textile applications.

It is an object of the present invention to prepare a film coating on the microporous membrane to protect the membrane from abrasion and wear while not interfering significantly with breathability.

In the present era of workers health and environmental awareness, it is another object of the present invention to avoid the use of toxic chemicals such as isocyanates, amines, dioxane, etc.

These and other objects of the instant invention are achieved by using a multilayered coating to impart water resistance and breathability to a textile substrate. A first cellular foam adhesive layer is mechanically formed in solution from a fully reacted polymer latex such as polyvinyl chloride, acrylic, polyurethane, polyethylene, polystyrene, copolymers of urethane and acrylic monomers, and mixtures thereof. This solution is coated on a fabric substrate. A microporous membrane structure is produced using a solvent/non-solvent method from a thermoplastic polymer such as polyvinylidene fluoride, polyvinylidene chloride, and thermoplastic polyurethane, and coated upon the adhesive layer. A continuous film third layer formed from acrylic, polyvinyl chloride or polyurethane latex is coated on the microporous membrane layer. In this way, a highly effective waterproof, breathable fabric can be manufactured by an environmentally safe method.

DETAILED DESCRIPTION OF THE INVENTION

Figure 1:
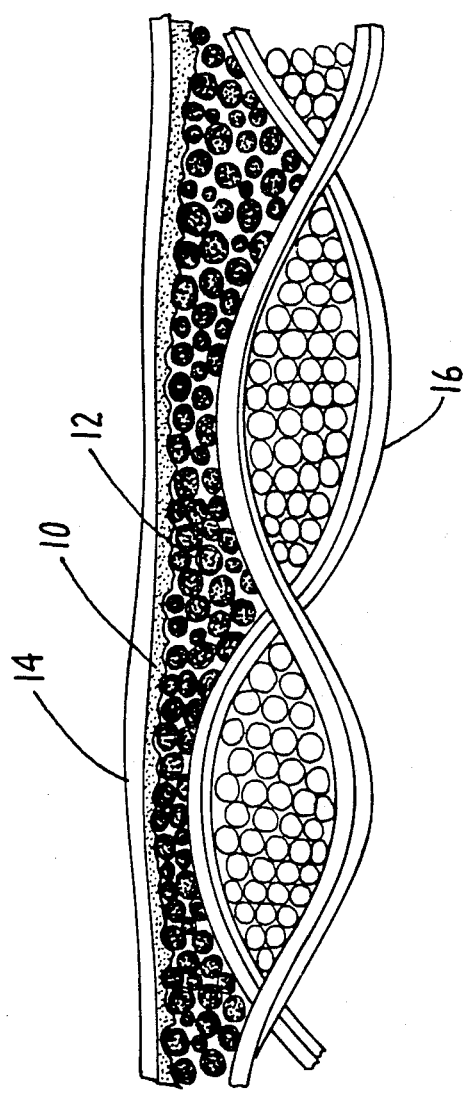
FIG. 1 is a schematic sectional view of the coatings as applied to a woven textile substrate in the present invention.

The present invention provides a waterproof, breathable fabric useful in rainwear, sportswear, tents, automotive, marine and industrial covers, and other areas where the qualities of breathability and waterproofness are desired. The fabric is rendered waterproof and breathable through the use of a multilayered structure as illustrated in FIG. 1. This structure consists of a microporous membrane 10 sandwiched between a cellular foam adhesive layer 12 and a continuous, protective film 14.

A wide variety of fabric substrates are useful in conjunction with the present invention, including woven and knit fabrics of rayon, nylon, polyester, acrylic and blends thereof. In addition, nonwoven fabrics of nylon, polyester are also useful as are natural fibers such as cotton or cotton/polyester blends.

Figure 2:
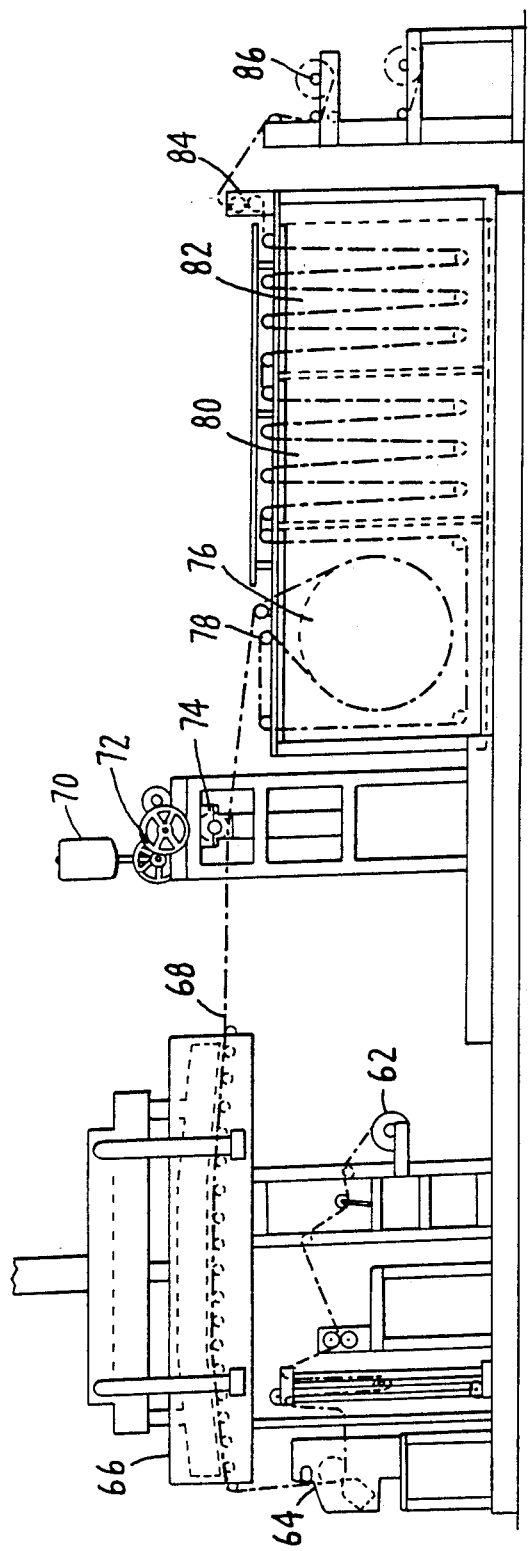
FIG. 2 is a schematic of the process of the present invention.

The multilayered structure is formed and coated onto the fabric substrate 16 in the following manner. Referring now to FIG. 2, a fabric roll is mounted on a machine unwind 62, and threaded through the rest of the apparatus. The cellular foam adhesive first layer is produced by mechanically foaming a water based latex solution containing a fully reacted polymer to a density of approximately 0.05 to 0.40 g/ml, more preferably 0.10 to 0.25 g/ml. Foam is produced by introducing pressurized air into the polymer coating solution. Shear from mechanical mixing reduces the viscosity of the solution surrounding the large air bubbles, causing continual reduction in bubble size and an increase in bubble number. Under the correct conditions of air, liquid feed rate and shear, a foam of the desired density and stability is formed. These parameters are well known in the art and depend on the type of machinery used.

The foamed latex is applied as a first layer to the fabric substrate 16, by a knife over roll coater 64, preferably to a thickness of 0.002 to 0.10 inches, and dried in an oven 66 at an elevated temperature, preferably 200 to 300 degrees Fahrenheit.

A wide variety of latex materials are suitable for use as a foamable material in the present invention. Suitable polymers include polyvinyl chloride, polyurethane, acrylic, polystyrene, polyethylene or mixtures thereof. Specific examples include the proprietary compound Hycar 26322 from B. F. Goodrich which is a fully reacted carboxy-modified acrylic latex or fully reacted polyurethane latex, such as WitcoBond 290H from Witco, or a co-polymer of urethane and acrylic constituents such as the experimental compound Darathane CL-204160 from W. R. Grace & Co. Darathane CL-204160 is a hydrophobic material consisting of approximately 75% acrylic copolymer and 25% urethane prepolymer. Suitable cellular foam layers can also be formed from a solution containing fully reacted polyurethane latex and acrylic latex. It is readily apparent that several other suitable compounds could be utilized in the practice of the instant invention.

The latex is chosen and processed such that the resulting foam will dry to a stable, open celled structure adhered to the surface of, but not penetrating into, the textile substrate. The foam adhesive layer should possess a void volume of from approximately 60 to 90%, more preferably 70 to 80%. The void volume is a measure of the empty spaces existing in the foam structure and is a function of the liquid feed rate and amount of air introduced into the solution during foaming as described above. Due to the open celled structure of this adhesive layer, it does not interfere with transfer of moisture vapor. The foam layer 12 provides a suitable foundation for the coating solution used to form the microporous membrane 10 which is layered upon the cellular foam layer which serves to adhere the microporous membrane to the fabric substrate 16.

A holding vessel 70 contains a solution used to form the microporous membrane. A number of polymers exist that are suitable for use in the present invention. They must exhibit low flexural modulus, low water absorption, and solubility in a solvent suitable for use in a solvent/non-solvent method (described below). Suitable polymers include thermoplastic polymers such as polyvinylidene fluoride (PVDF), polyvinylidene chloride, thermoplastic polyurethane or mixtures thereof. Particularly suitable for use are the proprietary compounds Kynar 460 or Kynar 760 which are thermoplastic polyvinylidene fluoride substances available from Penwalt.

In addition, a number of elastomeric materials are useful for mixtures with the above thermoplastic polymers to produce softer microporous membranes. Among these are a class of elastomeric fluoropolymers (fluoroelastomers) such as those sold under the name Viton, produced by E. I. DuPont de Nemours & Co., and Fluorel by the Minnesota Mining and Manufacturing Co., or Kynar 2800 available from Penwalt. Also useful are a class of silicones sold under the trademark Silastic by General Electric Co., and silicone gum by Dow Corning.

Solvents for dissolving the membrane-forming polymer can be chosen from such liquids as dimethylformamide, tetrahydrofuran and dimethylacetamide. Particularly useful is the solvent M-Pyrol produced by GAF. This is a high boiling solvent with very low toxicity. In addition it is biodegradable.

The microporous membrane solution is prepared by adding approximately 25% polymer, by weight, to solvent which has been heated to approximately 150 degrees Fahrenheit in the holding vessel 70. The polymer so added can consist of either approximately 25% thermoplastic polymer or approximately 12.5% thermoplastic polymer and 12.5% fluoroelastomer as described above. This solution is dispensed via pump 72 into a slot die applicator 74, and coated as a second layer onto the cellular foam adhesive-coated fabric 16 moving beneath the surface of the slot die 74. Alternatively, the solution of desired polymer in solvent can be coated on the surface of the cellular foam by knife over roll coating. This technique is well known in the textile industry. The coating is preferably applied to a thickness of approximately 0.002 to 0.008 inches and soaks into the surface of the open celled foam, filling the void areas, but does not soak into the fabric. The textile substrate thus coated enters a bath containing water at ambient temperature.

The solvent/non-solvent process takes place in this bath and yields a fabric possessing an attached microporous membrane. A membrane thus produced owes its porosity to immobilization of the polymer gel prior to complete solvent depletion. In this case the codiffusion of solvent out of, and water (non-solvent), into the polymer solution causes a separation of the solution into two interdispersed phases. One phase will contain concentrated polymer in solution becoming the membrane structure, the other a mixture of solvent in water becoming the micropores. Since the liquid coating solution has already filled the void areas of the foam, the produced microporous membrane is intertwined with the foam structure. This provides effective mechanical adhesion between the microporous membrane layer and the foam layer.

During this solvent/non-solvent process the partially formed membrane is very delicate. Thus, some means must be provided to hold the textile substrate flat, and prevent contact between the coated surface and any rollers or other substrate handling equipment. The Drum Coagulator described in U.S. Pat. No. 4,598,662 is utilized in this process. The coated fabric enters a drum coagulator bath 76 containing water at ambient temperature. The coated fabric remains on the drum approximately two minutes. The time spent on the drum allows the formation of a microporous structure to take place before contact with rollers in a tank 78.

The coated fabric is then run through two additional wash tanks 80 and 82, containing water at ambient temperature. This serves to remove any residual solvent left in the membrane. Fresh water is continually fed into the tank 82 and flows countercurrent to the fabric. The wash is followed by a nip 84 to remove excess water and the coated fabric is rolled up via a windup 86.

Figure 3:
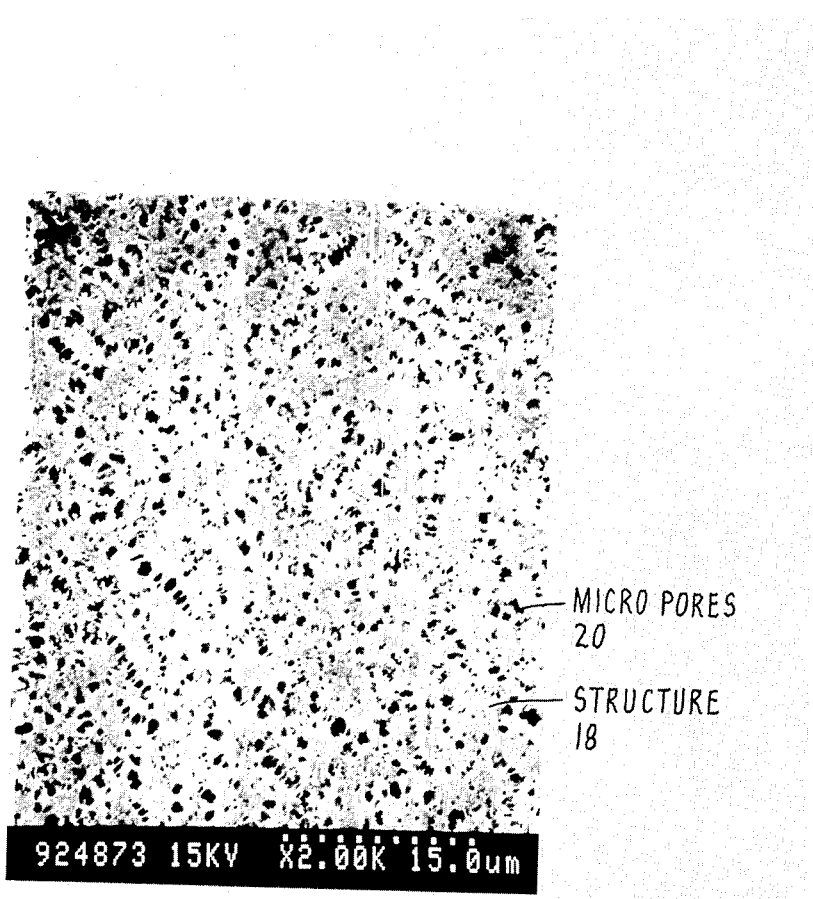
FIG. 3 is an electron micrograph, magnification 2000×, of the surface of the microporous membrane of the present invention.

The wet coated material is returned to the unwind 62 and run through the oven 66 to dry the coating, bypassing the wash tanks 76, 80 and 82 and moving straight to the windup 86. The microporous structure produced possesses a pore size ranging from approximately 1 to 2 microns, as determined by scanning electron microscope, a void volume of 55 to 70%, and a thickness of 0.0005 to 0.004 inches. This structure is both waterproof and breathable, forming a barrier to liquid water from the outside environment while allowing the passage of water vapor. FIG. 3 is a surface electron micrograph of the microporous membrane showing the structure 18 and void micropores 20.

A third layer of a water based, film-forming material is applied on the surface of the microporous membrane 10. The continuous film formed from this material should be flexible, adhere to the microporous membrane 10, and should not interfere with the transfer of moisture vapor. In addition, the continuous film produced must be of sufficient strength to provide protection for the microporous membrane underneath. Suitable materials may be found among acrylic, polyvinyl chloride and polyurethane latexes and mixtures of the above, preferably polyurethane latex. For example, the polyurethane solution PU-402A, manufactured by Mobay American Corp., is suitable for use as the final film coating as is the experimental compound Darathane CL-204160 described above.

Additives, such as slip agents to prevent the continuous film from sticking to itself, can be used in the film coating solution. One such compound is Slipayd AL140, available from Daniel Products. A silica substance, such as the proprietary compound CabOSil EH5, from Cabot, can also be added to improve the feel of the coated textile.

The latex solution is applied by knife over roll or Mayer rod, both standard techniques used in the textile industry, to a thickness of approximately 0.0005 to 0.005 inches and cured for approximately 2 to 5 minutes at 200 to 300 degrees Fahrenheit to produce a protective continuous film.

The multilayered textile thus produced is breathable, waterproof and retains desirable feel and flexibility. The invention will be further described in the following examples which are intended to illustrate, but not limit, the invention.

The tests used in the examples are:

1. Test Method Used to Determine Flexibility

Figure 4:
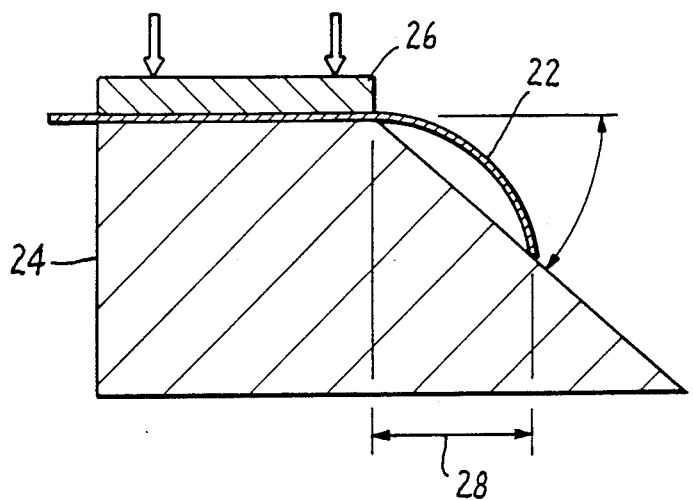
FIG. 4 shows the test apparatus used to determine the bending radius, or flexibility, of coated materials as described in ASTM D1388-64.

The test used to determine the flexibility of microporous membranes is provided in ASTM D1388-64. FIG. 4 illustrates the apparatus used. A strip of treated fabric 22 is placed on a support 24 so that its end projects from the horizontal surface of the support 24. The fabric is held in place by a weight 26. The length of overhang is measured when the fabric 22 is depressed under its own weight to the point where the line joining the strip of the fabric 22 to the edge of the support 24 makes an angle of 51.5 degrees from horizontal. One half of this length 28 is the bending radius of the sample.

2. Test Method used to Determine Low Pressure Hydrostatic Resistance

Figure 5:
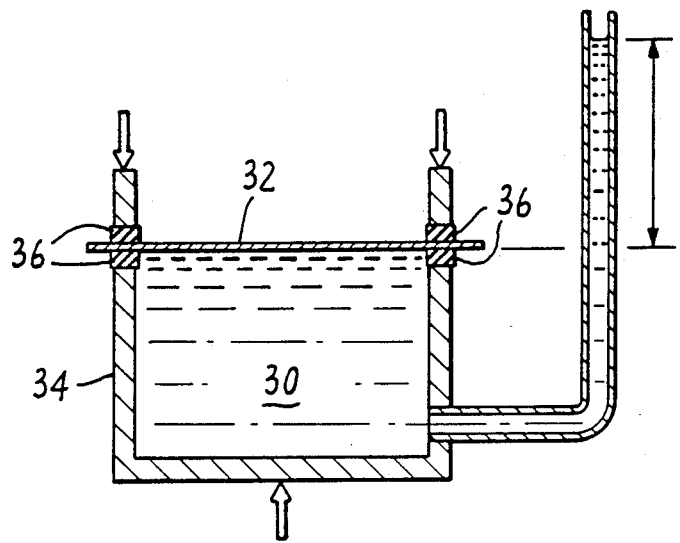
FIG. 5 shows the test apparatus used to determine low pressure hydrostatic resistance.

The test apparatus used to determine the low pressure hydrostatic resistance (LPHR) is illustrated in FIG. 5 and described in Fed. Std. 191A-5514. Water 30, under a hydrostatic head of 50 cm is forced against the test sample 32 which has been sealed to a container 34 by gaskets 36. The upper surface of the sample is observed for water leakage. The sample 32 has passed the LPHR test if no water is observed after five minutes.

3. Test Method use to Determine High Pressure Hydrostatic Resistance

Figure 6:
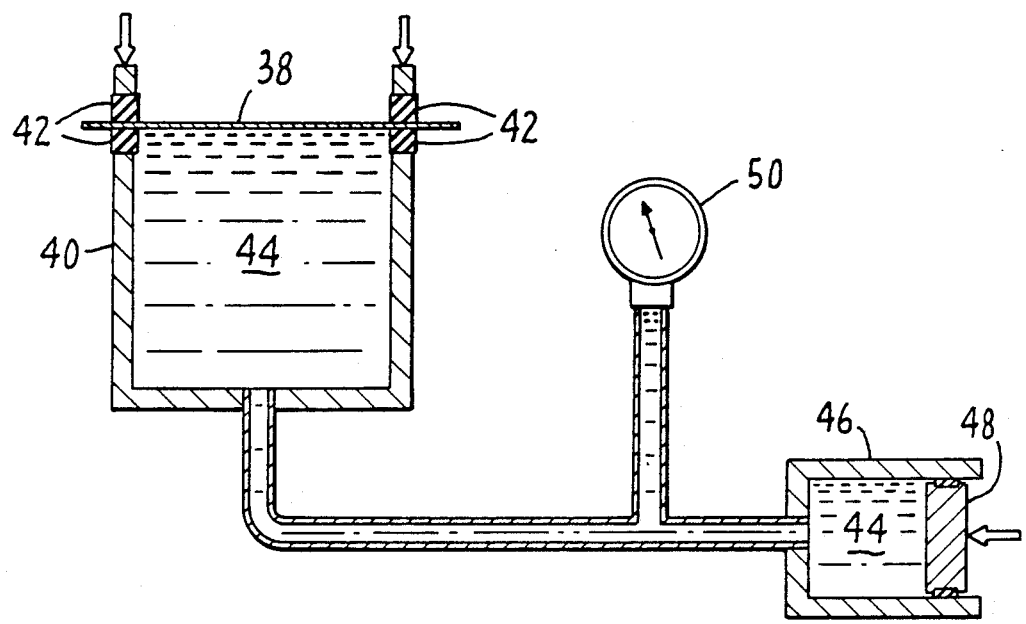
FIG. 6 shows the Mullen Burst Test apparatus as described in ASTM D751-75.

The Mullen Burst test apparatus used to determine the high pressure hydrostatic resistance (HPHR) is described in ASTM D751-75 and illustrated in FIG. 6. The test sample 38 is secured to the top of the test apparatus 40 and sealed with gaskets 42. The water pressure in the apparatus is raised by forcing water 44 from a cylinder 46 by means of a piston 48. The water pressure is indicated on a gauge 50. As pressure is increased the sample is visually observed for the appearance of water. The pressure on the gauge 50 at which water first penetrates the surface of the sample is the high pressure hydrostatic resistance.

4. Test Method used to Determine Moisture Vapor Transmission Rate

Figure 7:
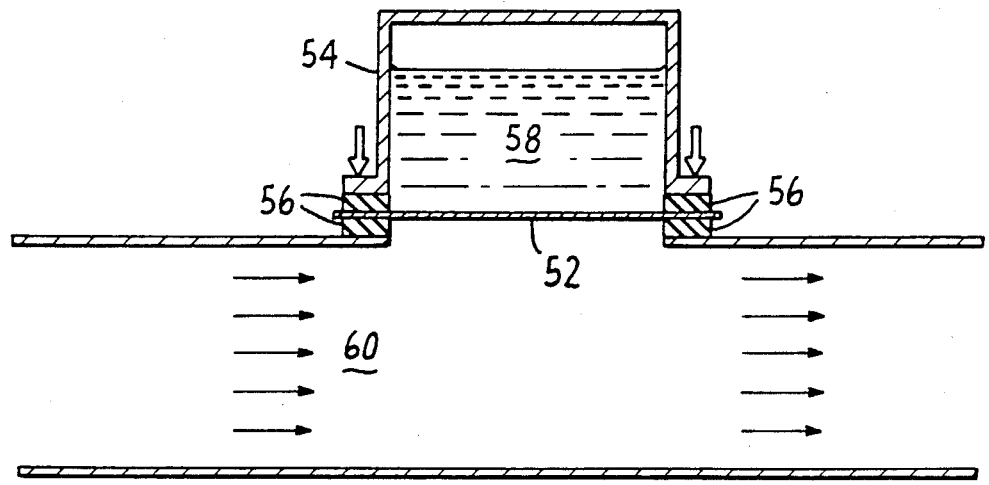
FIG. 7 shows the apparatus used to determine a moisture vapor transmission rate as described in ASTM E96-80 Procedure BW.

The test apparatus for moisture vapor transmission rate (MVTR) is described in ASTM E96-80 Method BW and illustrated in FIG. 7. A sample 52 acts as a cover for a sample cup 54 that is sealed with gaskets 56 and filled with water 58. The sample cup is inverted in a stream of air 60 at 72 degrees F. and 50% RH. The MVTR is determined by weighing the sample before and after the test period, thus giving the moisture transmitted through the sample 52.

EXAMPLE I

A microporous membrane layer was produced via the following method. A series of solutions were prepared from a mixture of Kynar 460, a thermoplastic polyvinylidene fluoride (PVDF) manufactured by Penwalt with flexural modulus 200,000 psi (ASTM D790), and Kynar 2800 a fluoroelastomer available from Penwalt with flexural modulus 90,000 psi. Blends of 0% fluoroelastomer, 20% fluoroelastomer and 50% fluoroelastomer, solids basis, were prepared. These blends were dissolved in M-Pyrol at 50–60 degrees C., in an amount of approximately 25% blend (by weight), filtered to remove undissolved gels and degassed to remove air bubbles. The polymer solutions were then cast 0.006 inches thick on a glass plate. The coated plate was immersed in a water bath at 20 degrees C. for 2 hours to allow complete solvent removal. Samples were then dried at 100 degrees C. for 5 minutes. After drying, the resulting microporous membranes were pealed from the surface of the plate. The properties of the membranes thus produced are given in Table 1.

TABLE 1

|  | SAMPLE 1 | SAMPLE 2 | SAMPLE 3 |
| --- | --- | --- | --- |
| % Kynar 2800 in membrane | 0.0 | 20.0 | 50.0 |
| Thickness, mil | 3.0 | 2.5 | 2.4 |
| MVTR, g/sqm/day | 18,900 | 16,200 | 16,500 |
| Mullen, psi | 78 | 65 | 45 |
| Bending Radius, cm | 3.2 | 2.0 | 0.6 |

Although addition of the fluoroelastomer slightly reduced the MVTR, the great reduction in bending radius indicates that the membranes containing the fluoroelastomer will give much softer coated textiles.

Similar results were obtained when other materials of low flexural modulus were tried alone or blended with thermoplastic polyvinylidene fluoride.

EXAMPLE II

The solution produced from the 50% PVDF/fluoroelastomer blend from Example I was coated 0.004 inches thick on a woven 88P nylon Taffeta. This coated fabric was immersed in a water bath at 25 degrees C. for 2 hours, then dried at 110 degrees C. for 20 minutes. The result was a textile with a microporous membrane attached to one surface. The coated fabric exhibited the following properties:

| COATING WEIGHT: | 0.50 oz./sq.yd. |
| --- | --- |
| MVTR: | 7500 g./sq.m./day |
| Mullen: | 45 psi |

Although the coated fabric exhibited excellent performance with respect to waterproofness and breathability, several problems were readily apparent. Although the coating solution itself produced a membrane of suitable softness, when cast on fabric the resulting composite was rather stiff. This was due to the polymer solution striking through the fabric, restricting the otherwise freely moving fabric fibers. In addition, the membrane delaminated completely from the fabric substrate after only 5 wash and dry cycles. The surface of the membrane was easily damaged by abrasion, rendering it no longer waterproof.

EXAMPLE III

The following procedure was used to produce a multilayered textile. The fabric substrate used was an 88P, 50D nylon taffeta. This fabric is typical of that used in the production of outerwear garments. Other textile substrates could be substituted with only minor variations in processing parameters.

Referring again to FIG. 2, A fabric roll was mounted on a machine unwind 62, and threaded through the rest of the apparatus.

The following solution was prepared for use as the foam adhesive first layer.

|  | Parts by Weight |
| --- | --- |
| WitcoBond 290H | 100.0 |
| Acrysol ASE-60 (Thickener) | 3.0 |
| Ammonium Stearate (Surfactant) | 8.0 |

WitcoBond 290H, available from Witco, is a fully reacted polyurethane dispersion that is typical of the foamable materials suitable for this application.

This solution was mechanically foamed, with the addition of dry air, to a density of 0.18 g/ml. The foam thus produced was applied by a knife over roll coater 64 to a thickness of 0.006 inches. The coated fabric entered an oven 66 and was dried for 3 minutes at 280 degrees Fahrenheit. This produced an open celled foam with a void volume of 75 to 80%, adhered to the outer surface of the fabric 16. The weight of this coating ranged from 0.2 to 0.3 oz/sq.yd.

A holding vessel 70 containing the 50% PVDF/fluoroelastomer blend described in Example I, was dispensed via pump 72 into a slot die applicator 74, and coated onto the fabric 16 moving beneath the surface of the slot die 74. The coating was applied 0.004 inches thick and soaked into the surface of the open celled foam, but not into the fabric.

The coated fabric then entered a drum coagulator bath 76 containing water at ambient temperature. The fabric remained on the drum approximately two minutes. The time spent on the drum allowed the formation of a microporous structure to take place before contact with rollers in a tank 78.

The fabric was then run through two additional wash tanks 80 and 82, containing water at ambient temperature. This served to remove any additional solvent left in the membrane. Fresh water was continually fed into the tank 82 and flowed countercurrent to the fabric. The wash was followed by a nip 84 to remove excess water and the coated fabric was rolled up via a windup 86.

The wet coated material was returned to the unwind 62 and run through the oven 66 to dry the coating, bypassing the wash tanks 76, 80 and 82 and moving straight to the windup 86.

The final coating was a fully reacted polyurethane solution, PU-402A manufactured by Mobay Chemical Corp. This was applied by Mayer Rod to a thickness of 0.002 inches. The coating was cured 3 minutes at 250 degrees Fahrenheit to give a continuous surface film.

The resulting coated fabric exhibited very good feel and appearance. No stiffness or strikethrough of the polymer coating were apparent on the samples. The following test data were obtained for this coated material:

| | |
|---|---|
| MVTR (ASTM E96-80 BW) | 5500 g./sqm./day |
| LPHR (FED 191A-5514) | No leaks after 5 min. |
| HPHR (ASTM D751-75) | 145 psig |
| Coating Weight | 0.8 oz./sq.yd. |

In addition, samples withstood 20 wash and dry cycles with no delamination, and exhibited excellent resistance to abrasion and damage of the microporous layer.

EXAMPLE IV

The fabric substrate described in Example III was treated in the following manner:

The following solution was prepared to produce the foam adhesive layer.

| | Parts by weight |
|---|---|
| Hycar 26322 (acrylic latex) | 100.0 |
| Fumed Silica (filler) | 5.0 |
| Ammonium Stearate (surfactant) | 10.0 |

Hycar 26322 is a product of B.F. Goodrich and is a fully reacted carboxy-modified acrylic latex. This solution was mechanically foamed using an SKG minimixer from SKG Industries, to a density of 0.15 g/ml. The foam was then coated onto the fabric substrate using a knife over roll coater to a thickness of 0.004 inches. The coated fabric was cured for 3 minutes at 300 degrees Fahrenheit. The result was a cellular foam which adhered to one side of the fabric. The foam had a void volume of 65 to 75% and a coating weight of 0.2 to 0.3 oz/sq.yd.

The 50% PVDF/fluoroelastomer solution described in Example I, was added 20% by weight to a holding vessel containing the solvent N-methyl pyrrolidone (M-pyrol) which had been heated to 150 degrees Fahrenheit. This was coated 0.005 inches thick on the surface of the cured foam layer. The coated material then entered a water coagulation bath. The bath contained a solution of 90% water and 10% M-pyrol at 75 degrees Fahrenheit. Contact with this solution coagulated the coating, producing a microporous film of PVDF on the surface of the foam. This film was 1 to 2 mils in thickness with a void volume of 60 to 65% and pore size ranging from 0.4 to 2 microns.

The material was run through two additional water baths to rinse out residual solvent and dried at 250 degrees Fahrenheit. A final coating of the proprietary compound Mace 37-87-2, available from Mace Adhesive and Coating, a solvent based, fully reacted polyurethane, was applied 0.002 inches thick using a floating knife. This coating was air dried at 220 degrees Fahrenheit to evaporate the solvent, leaving a surface film 0.5 to 1 mil in thickness.

The resulting coated fabric exhibited good hand and appearance. This fabric proved quite durable, with no visible delamination after 20 wash and dry cycles. Testing showed a high degree of waterproofness and good breathability.

The properties of the coated fabric were as follows:

| | |
|---|---|
| MVTR (ASTM E96-80 BW) | 4000 g./sq.m/day |
| LPHR (FED 191A-5514) | No leaks after 5 min. |
| HPHR (ASTM D751-75) | 160 psig |
| Coating Weight | 0.9 oz/sq.yd. |

EXAMPLE V

The fabric substrate described in Example III was treated in the following manner.

The following solution was prepared to produce the adhesive foam layer.

| | Parts by Weight |
|---|---|
| Hycar 26322 (acrylic latex) | 50.0 |
| Witcobond 290H | 50.0 |
| Fumed Silica (filler) | 2.0 |
| Ammonium Stearate (surfactant) | 8.0 |

The Witcobond 290H is a fully reacted polyurethane dispersion that is compatible with the Hycar 26322.

This solution was mechanically foamed, with the addition of dry air, to a density of 0.18 g/ml. The foam was applied to the fabric with a knife over roll to a thickness of 0.005 inches. The coated fabric was cured for 3 minutes at 280 degrees Fahrenheit. This resulted in a cellular foam with a void volume of 75 to 80% adhered to one surface of the fabric. The weight of this coating ranged from 0.3 to 0.4 oz/sq.yd.

The 50% PVDF/fluoroelastomer solution described in Example I was applied and treated in the same manner as in Example IV. The result was the same microporous membrane structure on the foam surface.

The final coat was WitcoBond W-160, a fully reacted polyurethane latex solution available from WITCO, applied 0.001 inches thick using a floating knife. This solution was cured 3 minutes at 250 degrees Fahrenheit to give the continuous surface film.

The resulting coated fabric also exhibited very good feel and appearance. The material showed no signs of delamination after 20 wash and dry cycles.

The properties of the coated fabric were as follows:

| | |
|---|---|
| MVTR (ASTM E96-80 BW) | 5500 g./sq.m./day |
| LPHR (FED 191a-5514) | No leaks after 5 min. |
| HPHR (ASTM D751-75) | 145 psig |
| Coating Weight | .8 oz/sq.yd. |

EXAMPLE VI

A 2.75 oz./sq.yd. Taslite-Supplex woven nylon was used as the fabric substrate. This is a very soft, breathable fabric.

The following solution was prepared to produce the foam adhesive layer.

| | Parts by Weight |
|---|---|
| Polyurethane Latex (Witcobond 290H) | 100.0 |
| Ammonium Stearate (surfactant) | 5.0 |
| Carbopol 1342 (thickener) | 1.0 |

The Witcobond 290H is a fully reacted polyurethane dispersion. Carbopol 1342 is an acrylic acid polymer manufactured by B. F. Goodrich and used as a thickener.

This solution was mechanically foamed to a density of 0.18 g/ml. It was then applied 0.005 inches thick on the fabric using a knife over roll coater. The coated fabric was cured 5 minutes at 250 degrees Fahrenheit. This resulted in a polyurethane cellular foam that adhered to one surface of the fabric. This foam had a void volume of 70 to 80% and a coating weight of 0.2 to 0.25 oz/sq.yd.

Estane 5707, from B. F. Goodrich, a solution consisting of 20% thermoplastic polyurethane in the solvent M-pyrol, was cast 0.005 inches thick on the surface of the cured foam. This coating was coagulated and washed in the same manner as the PVDF/fluoroelastomer coating described in Example IV. The result was a microporous film similar in structure to that described in Example IV but composed of polyurethane.

The final coating was the same latex polyurethane solution described in Example V.

The finished fabric had a very good feel, appearance and resistance to abrasion. It proved very durable, showing no signs of delamination after 30 wash and dry cycles.

The properties of the coated fabric were as follows:

| | |
|---|---|
| MVTR (ASTM E96-80 BW) | 8500 g./sq.m/day |
| LPHR (FED 191A-5514) | No leaks after 5 min. |
| HPHR (ASTM D751-75) | 120 psig |
| Coating Weight | .8 oz./sq.yd. |

It should be understood that various alternatives to the structure and process herein disclosed may be employed in practicing the present invention. It is intended that the following claims define the invention, and that the structure and process within the scope of these claims and their equivalents be covered thereby.

What is claimed is:

1. A multilayered coating for use in simultaneously imparting water resistance and breathability to a textile substrate which coating comprises:

a first layer, adjacent to the textile substrate, consisting of a foamed adhesive which adhesive is mechanically formed in solution from a fully reacted polymer latex chosen from the group consisting of polyvinyl chloride, acrylic, polyurethane, polyethylene, polystyrene copolymers of urethane and acrylic monomers, and mixtures thereof, to create an open celled surface;

a second layer, coated on the first layer distal to the textile substrate, comprising a microporous membrane formed from a thermoplastic polymer selected from the group consisting of polyvinylidene fluoride, polyvinylidene chloride, and thermoplastic polyurethane, said second layer being capable of passing water vapor across the width of the second layer in one direction from the surface adjacent to the first layer towards a third layer, and said second layer further being capable of inhibiting the flow of liquid water across the second layer in the opposite direction; and, a third layer, coated on the second layer, to inhibit the flow of liquid water in the direction of the second layer, and to impart abrasion resistance to the multilayered coating and textile substrate, said third layer comprising a continuous film formed from latexes selected from the group consisting of acrylics, polyvinyl chloride, polyurethane, and mixtures thereof.

2. The multilayered coating of claim 1 wherein the microporous membrane further comprises an elastomer selected from the group consisting of elastomeric fluoropolymers and silicones.

3. The multilayered coating of claim 1 wherein the foam adhesive has a void volume ranging from approximately 60 to 90%.

4. The multilayered coating of claim 1 wherein the microporous membrane is produced using a solvent/non-solvent method, said membrane comprising materials possessing a low flexural modulus, such that the microporous membrane formed exhibits a bending radius of less than 3.0 centimeters.

5. The multilayered coating of claim 1 wherein the microporous membrane structure formed possesses a pore size of less than 4 microns.

6. A process for the production of a multilayered, waterproof, breathable, coated textile comprising the steps of:

(a) mechanically foaming a solution containing a fully reacted polymer chosen from the group consisting of polyvinyl chloride, acrylic, polyurethane, polyethylene, polystyrene copolymers of urethane and acrylic monomers, and mixtures thereof, to create an open celled surface;

(b) coating said foamed polymer solution on a textile substrate to form a first layer, said first layer acting as an adhesive layer;

(c) forming a microporous membrane on the surface of said first layer, said microporous membrane produced from a thermoplastic polymer selected from the group consisting of polyvinylidene fluoride, polyvinylidene chloride, and thermoplastic polyurethane, using a solvent/non-solvent method, such that the microporous membrane formed exhibits a bending radius of less than 3.0 centimeters, and said microporous membrane being capable of passing water vapor across the width of the second layer in one direction from the surface adjacent to the first layer towards a third layer, and said microporous membrane further being capable of inhibiting the flow of liquid water across the second layer in the opposite direction; and (d) applying a continuous film layer comprising a water based latex selected from the group consisting of acrylics, polyvinyl chloride, polyurethane, and mixtures thereof, to the microporous membrane, said continuous film forming a protective surface on the microporous membrane structure.

7. The process of claim 6 wherein the microporous membrane layer further comprises an elastomer selected from the group consisting of elastomeric fluoropolymer and silicones.

* * * * *